(12) United States Patent
Zhang et al.

(10) Patent No.: US 11,403,553 B2
(45) Date of Patent: Aug. 2, 2022

(54) ARTIFICIAL INTELLIGENT SYSTEMS AND METHODS FOR IDENTIFYING A DRUNK PASSENGER BY A CAR HAILING ORDER

(71) Applicant: BEIJING DIDI INFINITY TECHNOLOGY AND DEVELOPMENT CO., LTD., Beijing (CN)

(72) Inventors: Guchao Zhang, Beijing (CN); Yizhen Wang, Beijing (CN); Yashu Liu, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 888 days.

(21) Appl. No.: 16/232,046

(22) Filed: Dec. 25, 2018

(65) Prior Publication Data
US 2020/0160213 A1    May 21, 2020

Related U.S. Application Data

(63) Continuation of application No. PCT/CN2018/117078, filed on Nov. 23, 2018.

(30) Foreign Application Priority Data

Nov. 16, 2018    (CN) .......................... 201811367896.1

(51) Int. Cl.
*G06N 20/00*    (2019.01)
*G06F 16/28*    (2019.01)

(52) U.S. Cl.
CPC ........... *G06N 20/00* (2019.01); *G06F 16/285* (2019.01)

(58) Field of Classification Search
None
See application file for complete search history.

(56) References Cited

U.S. PATENT DOCUMENTS 8,686,864 B2    4/2014  Hannon
10,654,411 B2 *  5/2020  O'Herlihy ............... H04L 67/12
(Continued)

FOREIGN PATENT DOCUMENTS

CN    106778652 A    5/2017
CN    107133645 A    9/2017
(Continued)

OTHER PUBLICATIONS

Ye, Jerry, et al. "Stochastic gradient boosted distributed decision trees." Proceedings of the 18th ACM conference on Information and knowledge management. 2009. (Year: 2009).*
(Continued)

*Primary Examiner* — Daniel T Pellett
(74) *Attorney, Agent, or Firm* — Metis IP LLC

(57) ABSTRACT

The present disclosure relates to a system and a method for identifying a drunk passenger of a car hailing order. The system may perform the method to: obtain a plurality of samples from historical car hailing orders stored in a database; for each of the plurality of samples, using an application, extract a plurality of features including a passenger feature set, a driver feature set, and an order feature set, wherein the order feature set includes drunk-hotspot-relating features; and train a preliminary classification model based on the plurality of features and the plurality of samples to obtain a drunk model.

18 Claims, 9 Drawing Sheets

(56) References Cited

U.S. PATENT DOCUMENTS

| | | | |
|---|---|---|---|
| 2012/0123806 A1 | 5/2012 | Schumann, Jr. et al. | |
| 2014/0019138 A1 | 1/2014 | Stephens, Jr. | |
| 2015/0012277 A1 | 1/2015 | Stephens, Jr. | |
| 2017/0124483 A1 | 5/2017 | Huang | |
| 2018/0074494 A1 | 3/2018 | Myers et al. | |
| 2018/0157984 A1* | 6/2018 | O'Herlihy | G06N 20/00 |
| 2018/0268473 A1 | 9/2018 | Um et al. | |
| 2019/0143994 A1 | 5/2019 | Chen | |
| 2019/0180201 A1* | 6/2019 | Legault | G06Q 50/30 |

FOREIGN PATENT DOCUMENTS

| | | |
|---|---|---|
| CN | 105109337 B | 10/2017 |
| CN | 107764986 A | 3/2018 |
| JP | 2018106490 A | 7/2018 |

OTHER PUBLICATIONS

Schneider, I. V., et al. Alcohol-related hot-spot analysis and prediction. No. CTS 17-04. University of Minnesota. Center for Transportation Studies, 2017. (Year: 2017).*

Uber New Patents Can Detect if Passengers Are Drunk, 2018, 3 pages.

International Search Report in PCT/CN2018/117078 dated Aug. 16, 2019, 5 pages.

Written Opinion in POT/CN2018/1 17078 dated Aug. 16, 2019, 5 pages.

McHugh M., Uber and Lyft Drivers Work Dangerous Jobs—But They're on Their Own, 2016, 5 pages.

Office Action in Canadian Application No. 3028194 dated Nov. 13, 2019, 7 pages.

Extended European Search Report in European Application No. 18815099.9 dated Jan. 4, 2022, 9 pages.

* cited by examiner

ARTIFICIAL INTELLIGENT SYSTEMS AND METHODS FOR IDENTIFYING A DRUNK PASSENGER BY A CAR HAILING ORDER

CROSS-REFERENCE TO RELATED APPLICATIONS

This application is a continuation of International Application No. PCT/CN2018/117078, filed on Nov. 23, 2018, which claims priority of Chinese Application No. 201811367896.1, filed on Nov. 16, 2018, the contents of which are incorporated herein in its entirety by reference.

TECHNICAL FIELD

The present disclosure generally relates to artificial intelligent systems and methods for providing online to offline services, and more particularly, to artificial intelligent systems and methods for identifying a drunk passenger of a car hailing order.

BACKGROUND

With the development of Internet technology, online to offline (O2O) services, such as online car hailing services, play a more and more significant role in people's daily life. Conflicts between passengers who request for online car hailing services and drivers who provide such services occur more frequently accompanying the increasing of online car hailing orders. A large proportion of the conflicts are caused by the drunk passengers who have consumed excessive alcohol. Thus, the conflicts caused by the drunkenness of passengers need significant attentions. It is desirable to provide artificial intelligent systems and methods for identifying a drunk passenger by a car hailing order.

SUMMARY

An aspect of the present disclosure introduces a system for identifying a drunk passenger of a car hailing order. The system may include at least one storage medium including a set of instructions for identifying a drunk passenger of a car hailing order, and at least one processor in communication with the storage medium. When executing the set of instructions, the at least one processor may perform the following operations. The at least one processor may obtain a plurality of samples from historical car hailing orders stored in a database. For each of the plurality of samples, the at least one processor may extract a plurality of features including a passenger feature set, a driver feature set, and an order feature set using an application. The order feature set may include drunk-hotspot-relating features. The at least one processor may train a preliminary classification model based on the plurality of features and the plurality of samples to obtain a drunk model.

In some embodiments, the plurality of samples may include a positive sample set and a negative sample set. The positive sample set may include a plurality of historical drunk car hailing orders. The negative sample set may include a plurality of historical non-drunk car hailing orders.

In some embodiments, the passenger feature set may include a random passenger's essential features and features relating to the random passenger's historical orders. The driver feature set may include a random driver's essential features and features relating to the random driver's historical orders. The order feature set may further include a random order's essential features.

In some embodiments, the at least one processor may further identify a plurality of drunk hotspots based on a plurality of historical designated-driving orders.

In some embodiments, to identify the plurality of drunk hotspots, the at least one processor may further obtain a plurality of historical drunk designated-driving orders from the plurality of historical designated-driving orders. Each of the plurality of historical drunk designated-driving orders may include a start location. The at least one processor may further identify a plurality of areas based on the start locations of the plurality of historical drunk designated-driving orders. For each of the plurality of areas, the at least one processor may further determine whether the area meets a predetermined condition. In response to a determination that the area meets the predetermined condition, the at least one processor may designate the area as one drunk hotspot of the plurality of drunk hotspots.

In some embodiments, the predetermined condition may include at least one of a number of historical drunk designated-driving orders in the area is greater than a number threshold; or a ratio of a number of historical drunk-complaint car hailing orders to a number of historical drunk designated-driving orders is greater than a ratio threshold.

In some embodiments, to extract the plurality of features, for each of the plurality of samples, the at least one processor may further identify a start location. The at least one processor may further map the start location to a drunk hotspot. The at least one processor may extract the drunk-hotspot-relating features based on the drunk hotspot.

In some embodiments, the preliminary classification model may be a Gradient Boosted Decision Tree (GBDT) model.

In some embodiments, the at least one processor may further obtain a car hailing order from a passenger terminal of a passenger. The at least one processor may determine whether the passenger is drunk based on the car hailing order and the drunk model.

In some embodiments, to determine whether the passenger is drunk, the at least one processor may further obtain a drunk probability of the passenger. The car hailing order may be an input of the drunk model, and the drunk probability may be an output of the drunk model. The at least one processor may determine whether the drunk probability is greater than a probability threshold. In response to a determination that the drunk probability is greater than the probability threshold, the at least one processor may determine that the passenger is drunk.

In some embodiments, in response to a determination that the passenger is drunk, the at least one processor may further send an alert to a driver terminal of a driver of the car hailing order, displayed on a driver interface of the driver terminal.

According to another aspect of the present disclosure, a method for identifying a drunk passenger of a car hailing order may include obtaining a plurality of samples from historical car hailing orders stored in a database; for each of the plurality of samples, using an application, extracting a plurality of features including a passenger feature set, a driver feature set, and an order feature set, wherein the order feature set includes drunk-hotspot-relating features; and training a preliminary classification model based on the plurality of features and the plurality of samples to obtain a drunk model.

According to still another aspect of the present disclosure, a non-transitory computer readable medium, comprising at least one set of instructions compatible for identifying a drunk passenger of a car hailing order. When executed by at least one processor of an electrical device, the at least one set of instructions directs the at least one processor to perform a method. The method may include obtaining a plurality of samples from historical car hailing orders stored in a database; for each of the plurality of samples, using an application, extracting a plurality of features including a passenger feature set, a driver feature set, and an order feature set, wherein the order feature set includes drunk-hotspot-relating features; and training a preliminary classification model based on the plurality of features and the plurality of samples to obtain a drunk model.

According to still another aspect of the present disclosure, a system for identifying a drunk passenger of a car hailing order may include a model training module. The model training module may be configured to obtain a plurality of samples from historical car hailing orders stored in a database. For each of the plurality of samples, the model training module may extract a plurality of features using an application. The plurality of features may include a passenger feature set, a driver feature set, and an order feature set, wherein the order feature set may include drunk-hotspot-relating features. The model training module may further train a preliminary classification model based on the plurality of features and the plurality of samples to obtain a drunk model.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
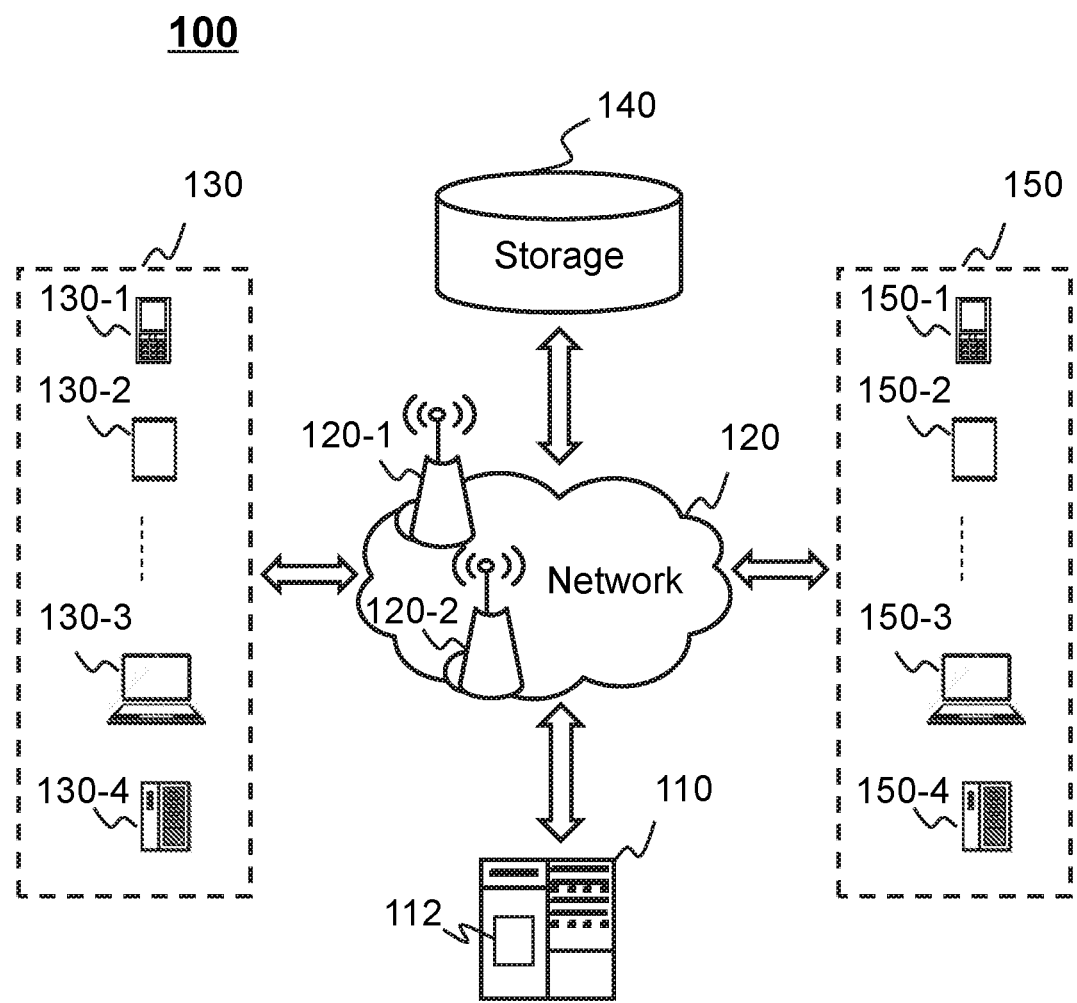
FIG. 1 is a schematic diagram illustrating an exemplary artificial intelligent system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to artificial intelligent systems and methods for identifying a drunk passenger of a car hailing order. To this end, the artificial intelligent systems and methods may train a drunk model using drunk-hotspot-relating features, and use the drunk model to predict whether a passenger that requests a car hailing order is drunk or not. The drunk-hotspot-relating features are extracted by mapping a start lactation of the car hailing order to a drunk hotspot that has enough historical drunk designated-driving orders and/or enough ratio of a number of historical drunk-complaint car hailing orders to a number of historical drunk designated-driving orders. In this way, the artificial intelligent systems and methods may determine whether a passenger is drunk or not by his hailing order, and take necessary preventive measures, when predicting the passenger is drunk, to reduce conflicts between the passenger and a driver of the car who is assigned to the hailing order.

FIG. 1 is a schematic diagram of an exemplary artificial intelligent (AI) system 100 according to some embodiments of the present disclosure. For example, the AI system 100 may be an online to offline service platform for providing services such as taxi hailing, chauffeur services, delivery vehicles, carpool, bus service, driver hiring, shuttle services, online navigation services, good delivery services, etc. The AI system 100 may include a server 110, a network 120, a passenger terminal 130, a storage 140, and a driver terminal 150. The server 110 may include a processing engine 112.

The server 110 may be configured to process information and/or data relating to a car hailing order. For example, the server 110 may determine whether a passenger that sends the car hailing order is drunk. As another example, the server 110 may train a drunk model to determine whether the passenger is drunk. As still another example, the server 110 may send an alert to a driver terminal of a driver that accepts the car hailing order in response that the passenger is drunk. In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the passenger terminal 130, and/or the storage 140 via the network 120. As another example, the server 110 may connect the passenger terminal 130, and/or the storage 140 to access stored information and/or data. In some embodiments, the server 110 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to relating to a car hailing order to perform one or more functions described in the present disclosure. For example, the processing engine 112 may determine whether a passenger that requests the car hailing order is drunk. As another example, the processing engine 112 may train a drunk model to determine whether the passenger is drunk. As still another example, the processing engine 112 may send an alert to a driver terminal of a driver that accepts the car hailing order in response that the passenger is drunk. In some embodiments, the processing engine 112 may include one or more processing engines (e.g., single-core processing engine(s) or multi-core processor(s)). Merely by way of example, the processing engine 112 may be one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the AI system 100 (e.g., the server 110, the passenger terminal 130, the storage 140, and the driver terminal 150) may transmit information and/or data to other component(s) in the AI system 100 via the network 120. For example, the server 110 may obtain a car hailing order from a passenger terminal 130 of a passenger via the network 120. As another example, the server 110 may send an alert to a driver terminal 150 of a driver of the car hailing order via the network 120. As still another example, the server 110 may obtain a plurality of samples to train a drunk model from the storage 140 via the network 120. In some embodiments, the network 120 may be any type of wired or wireless network, or combination thereof. Merely by way of example, the network 120 may be a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the AI system 100 may be connected to the network 120 to exchange data and/or information between them.

The passenger terminal 130 may be any electronic device used by a service requester of the online to offline service (e.g., a passenger of a car hailing service). In some embodiments, the passenger terminal 130 may be a mobile device 130-1, a tablet computer 130-2, a laptop computer 130-3, a desktop computer 130-4, or the like, or any combination thereof. In some embodiments, the mobile device 130-1 may be a wearable device, a smart mobile device, a virtual reality device, an augmented reality device, or the like, or any combination thereof. In some embodiments, the wearable device may be a smart bracelet, a smart footgear, a smart glass, a smart helmet, a smart watch, a smart clothing, a smart backpack, a smart accessory, or the like, or any combination thereof. In some embodiments, the smart mobile device may be a smartphone, a personal digital assistance (PDA), a gaming device, a navigation device, a point of sale (POS) device, or the like, or any combination thereof. In some embodiments, the virtual reality device and/or the augmented reality device may be a virtual reality helmet, a virtual reality glass, a virtual reality patch, an augmented reality helmet, an augmented reality glass, an augmented reality patch, or the like, or any combination thereof. For example, the virtual reality device and/or the augmented reality device may be a Google Glass™, a RiftCon™, a Fragments™, a Gear VR™, etc. In some embodiments, the desktop computer 130-4 may be an onboard computer, an onboard television, etc.

In some embodiments, the passenger terminal 130 may be a device with positioning technology for locating the position of the passenger and/or the passenger terminal 130. The positioning technology used in the present disclosure may be a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

In some embodiments, the passenger terminal 130 may further include at least one network port. The at least one network port may be configured to send information to and/or receive information from one or more components in the AI system 100 (e.g., the server 110, the storage 140, the driver terminal 150) via the network 120. In some embodiments, the passenger terminal 130 may be implemented on a computing device 200 having one or more components illustrated in FIG. 2, or a mobile device 300 having one or more components illustrated in FIG. 3 in the present disclosure.

The storage 140 may store data and/or instructions. For example, the storage 140 may store historical car hailing orders and/or historical designated-driving orders. As another example, the storage 140 may store a plurality of samples including a positive sample set and a negative sample set. As still another example, the storage 140 may store a drunk model that used to determine whether a passenger is drunk. As still another example, the storage 140 may store data and/or instructions that the server 110 may execute or use to perform exemplary methods described in the present disclosure. In some embodiments, the storage 140 may be a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof.

In some embodiments, the storage 140 may include at least one network port to communicate with other devices in the AI system 100. For example, the storage 140 may be connected to the network 120 to communicate with one or more components of the AI system 100 (e.g., the server 110, the passenger terminal 130) via the at least one network port. One or more components in the AI system 100 may access the data or instructions stored in the storage 140 via the network 120. In some embodiments, the storage 140 may be directly connected to or communicate with one or more components in the AI system 100 (e.g., the server 110, the passenger terminal 130, the driver terminal 150). In some embodiments, the storage 140 may be part of the server 110.

The driver terminal 150 may be any electronic device used by a service provider of the online to offline service (e.g., a driver of the car hailing service). In some embodiments, the driver terminal 150 may have a same or similar configuration with the passenger terminal 140.

In some embodiments, one or more components of the AI system 100 (e.g., the server 110, the passenger terminal 130, the storage 140, and the driver terminal 150) may communicate with each other in form of electronic and/or electromagnetic signals, through wired and/or wireless communication. In some embodiments, the AI system 100 may further include at least one data exchange port. The at least one exchange port may be configured to receive information and/or send information relating to the car hailing service (e.g., in form of electronic signals and/or electromagnetic signals) between any electronic devices in the AI system 100. In some embodiments, the at least one data exchange port may be one or more of an antenna, a network interface, a network port, or the like, or any combination thereof. For example, the at least one data exchange port may be a network port connected to the server 110 to send information thereto and/or receive information transmitted therefrom.

Figure 2:
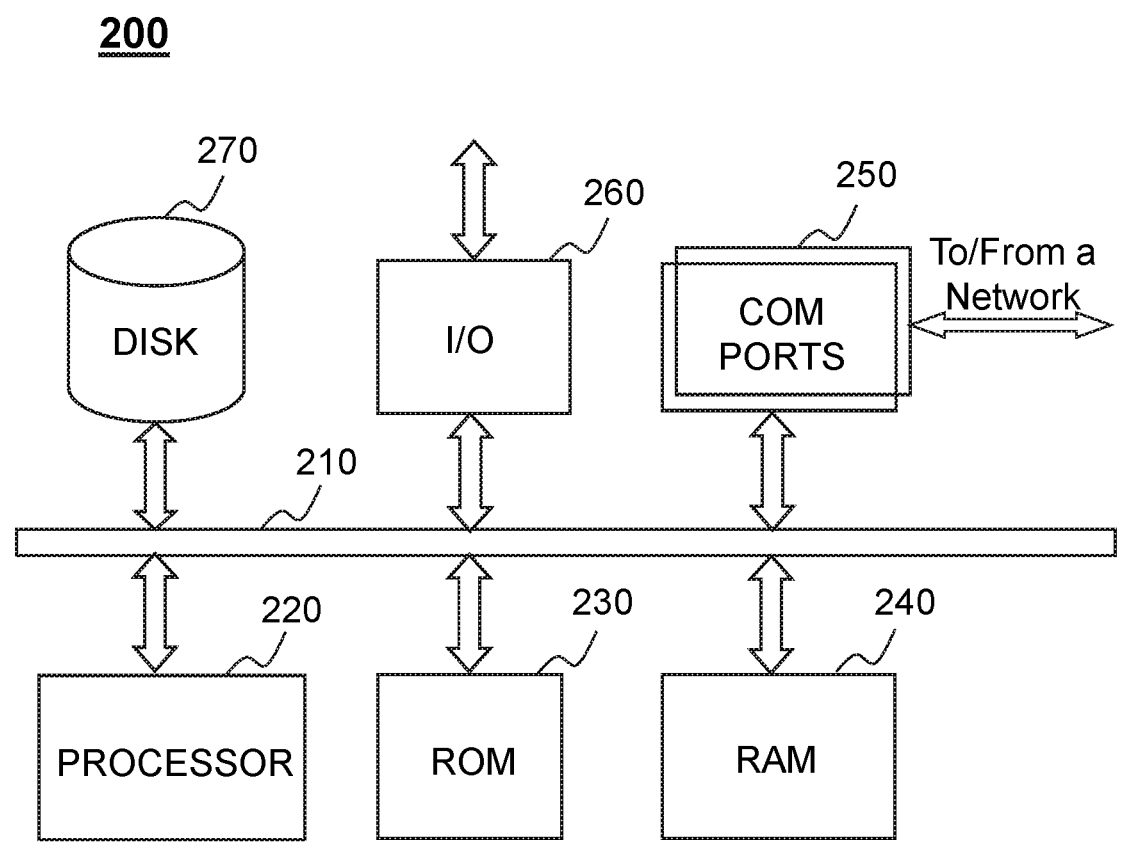
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, and/or the passenger terminal 130 may be implemented according to some embodiments of the present disclosure. For example, the processing engine 112 may be implemented on the computing device 200 and configured to perform functions of the processing engine 112 disclosed in this disclosure.

The computing device 200 may be used to implement an AI system 100 for the present disclosure. The computing device 200 may be used to implement any component of AI system 100 that perform one or more functions disclosed in the present disclosure. For example, the processing engine 112 may be implemented on the computing device 200, via its hardware, software program, firmware, or a combination thereof. Although only one such computer is shown, for convenience, the computer functions relating to the online to offline service as described herein may be implemented in a distributed fashion on a number of similar platforms, to distribute the processing load.

The computing device 200, for example, may include COM ports 250 connected to and from a network connected thereto to facilitate data communications. The COM port 250 may be any network port or data exchange port to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result (e.g., an alert that reminds the passenger is drunk) and a triggering code. In some embodiments, the trigger code may be in a format recognizable by an operation system (or an application installed therein) of an electronic device (e.g., the passenger terminal 130) in the AI system 100. For example, the trigger code may be an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result (e.g., a prediction result) on an interface of the electronic device. Then the interface circuits may send out the electronic signals from the processing circuits via the bus 210.

The exemplary computing device may include the internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The exemplary computing device may also include operation systems stored in the ROM 230, RAM 240, and/or other type of non-transitory storage medium to be executed by the processor 220. The program instructions may be compatible with the operation systems for providing the online to offline service. The computing device 200 also includes an I/O component 260, supporting input/output between the computer and other components. The computing device 200 may also receive programming and data via network communications.

Merely for illustration, only one processor is illustrated in FIG. 2. Multiple processors are also contemplated; thus, operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
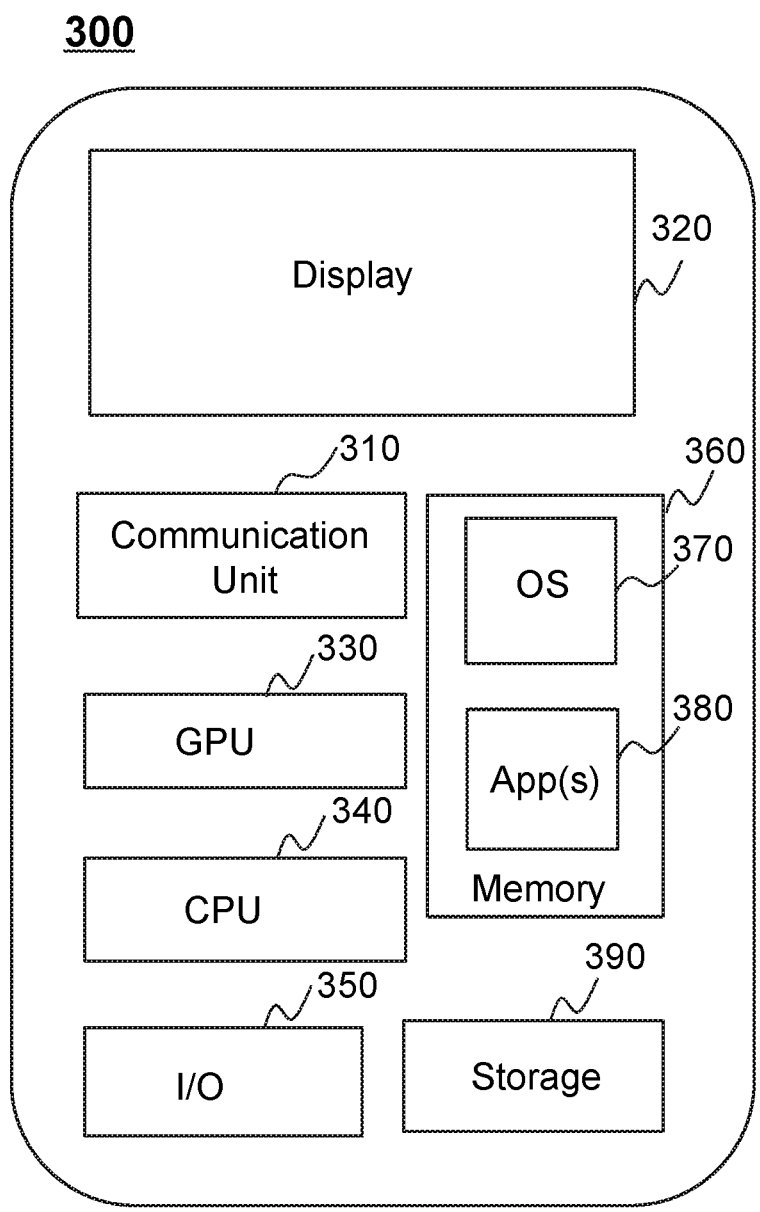
FIG. 3 is a schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the passenger terminal 130 may be implemented according to some embodiments of the present disclosure.

As illustrated in FIG. 3, the mobile device 300 may include a communication platform 310, a display 320, a graphic processing unit (GPU) 330, a central processing unit (CPU) 340, an I/O 350, a memory 360, and a storage 390. The CPU may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to the car hailing service. User interactions with the information stream may be achieved via the I/O devices 350 and provided to the processing engine 112 and/or other components of the system 100 via the network 120.

To implement various modules, units, and their functionalities described in the present disclosure, computer hardware platforms may be used as the hardware platform(s) for one or more of the elements described herein (e.g., the AI system 100, and/or other components of the AI system 100 described with respect to FIGS. 1-9). The hardware elements, operating systems and programming languages of such computers are conventional in nature, and it is presumed that those skilled in the art are adequately familiar therewith to adapt those technologies to identify whether a passenger of a car hailing order is drunk as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

One of ordinary skill in the art would understand that when an element of the AI system 100 performs, the element may perform through electrical signals and/or electromagnetic signals. For example, when a server 110 processes a task, such as determine whether a passenger of a car hailing order is drunk, the server 110 may operate logic circuits in its processor to process such task. When the server 110 completes determine that the passenger is drunk, the processor of the server 110 may generate electrical signals encoding the an alert that reminds the passenger is drunk. The processor of the server 110 may then send the electrical signals to at least one data exchange port of a target system associated with the server 110. The server 110 communicates with the target system via a wired network, the at least one data exchange port may be physically connected to a cable, which may further transmit the electrical signals to an input port (e.g., an information exchange port) of the passenger terminal 130. If the server 110 communicates with the target system via a wireless network, the at least one data exchange port of the target system may be one or more antennas, which may convert the electrical signals to electromagnetic signals. Within an electronic device, such as the passenger terminal 130, and/or the server 110, when a processor thereof processes an instruction, sends out an instruction, and/or performs an action, the instruction and/or action is conducted via electrical signals. For example, when the processor retrieves or saves data from a storage medium (e.g., the storage 140), it may send out electrical signals to a read/write device of the storage medium, which may read or write structured data in the storage medium. The structured data may be transmitted to the processor in the form of electrical signals via a bus of the electronic device. Here, an electrical signal may be one electrical signal, a series of electrical signals, and/or a plurality of discrete electrical signals.

Figure 4:
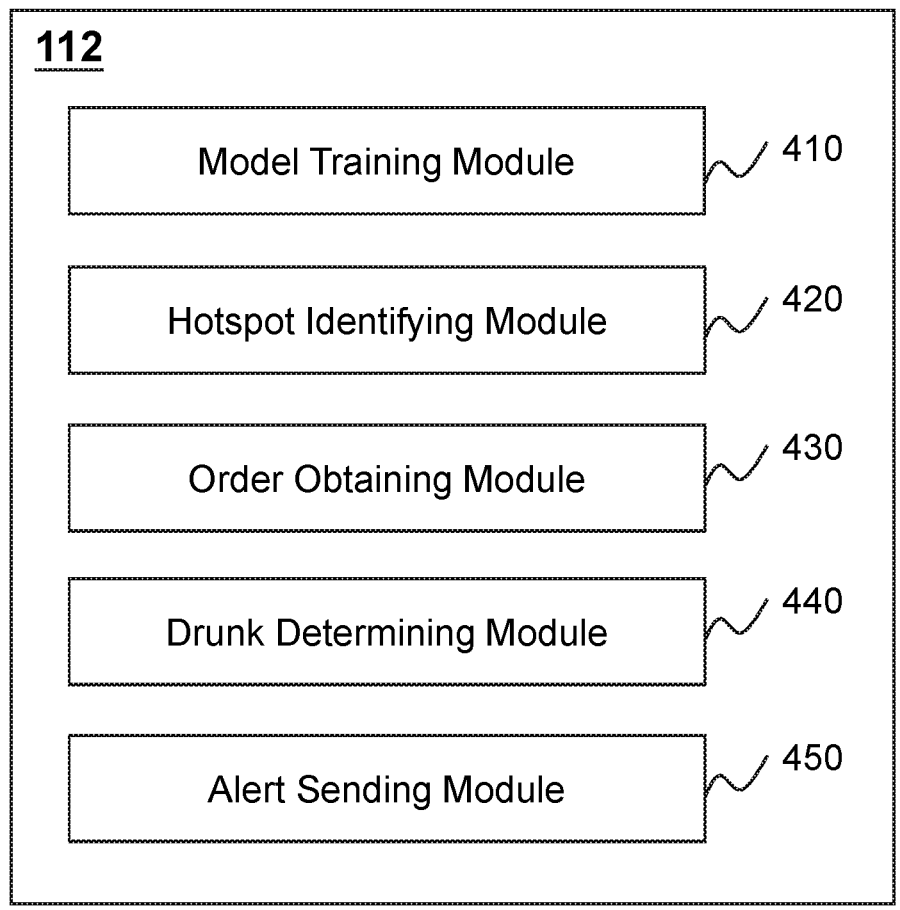
FIG. 4 is a block diagram illustrating an exemplary processing engine according to some embodiments of the present disclosure.

FIG. 4 is a block diagram illustrating an exemplary processing engine 112 according to some embodiments of the present disclosure. As illustrated in FIG. 4, the processing engine 112 may include a model training module 410, a hotspot identifying module 420, an order obtaining module 430, a drunk determining module 440, and an alert sending module 450.

The model training module 410 may be configured to train a preliminary classification model to obtain a drunk model. The drunk model may be used for predicting whether a passenger of a car hailing order is drunk. In some embodiments, the model training module 410 may obtain a plurality of samples from historical car hailing orders. For each of the plurality of samples, the model training module 410 may extract a plurality of features including a passenger feature set, a driver feature set, and an order feature set. The order feature set may include drunk-hotspot-relating features. The model training module 410 may further train the preliminary classification model based the extracted features and the plurality of samples. In some embodiments, the model training module 410 may identify a start location for each of the plurality of samples. The model training module 410 may map the start location to a drunk hotspot and extract the drunk-hotspot-relating features based on the drunk hotspot.

The hotspot identifying module 420 may be configured to identify a drunk hotspot or a non-drunk hotspot. The drunk hotspot may refer to an area where there may be a large number of drunk people. For example, the drunk hotspot may include more potential drunk passengers than the non-drunk hotspot. In some embodiments, the hotspot identifying module 420 may obtain a plurality of historical drunk designated-driving orders from a plurality of historical designated-driving orders. A historical designated-driving order may refer to a historical order that a historical requester requests for a service of designating a designated driver (also referred to as a designated-driving service) to drive a vehicle (e.g., a car) associated with the historical requester from a start location to a destination. A historical drunk designated-driving order may refer to a historical designated-driving order of which a historical requester is drunk. The hotspot identifying module 420 may identify a plurality of areas based on the start locations of the plurality of historical drunk designated-driving orders. For each of the plurality of areas, the hotspot identifying module 420 may determine whether the area is a drunk hotspot, for example, based on the number of historical drunk designated-driving orders in the area or a ratio of the number of historical drunk-complaint car hailing orders in the area to the number of historical drunk designated-driving orders in the area.

The order obtaining module 430 may be configured to obtain a car hailing order from a passenger terminal of a passenger. The car hailing order may be a real-time car hailing order or a car hailing order within a predetermined period (e.g., a night peak from 7:00 pm to 11:00 pm).

The drunk determining module 440 may be configured to determine whether the passenger of the car hailing order is drunk based on the car hailing order and the drunk model. In some embodiments, the drunk determining module 440 may input the car hailing order into the drunk model, and the drunk model may output a drunk probability of the passenger or a drunk category. The drunk determining module 440 may further determine whether the passenger is drunk based on the drunk probability of the passenger or the drunk category.

The alert sending module 450 may be configured to send an alert to a driver terminal of a driver of the car hailing order. In some embodiments, the alert sending module 450 may send the alert in response to the determination that the passenger is drunk. The alert may be displayed on a driver interface of the driver terminal. In some embodiments, the alert may include a notification that the passenger is drunk, a note that remind the driver to pay attention to avoid conflict, or the like, or any combination thereof.

The modules in the processing engine 112 may be connected to or communicate with each other via a wired connection or a wireless connection. The wired connection may be a metal cable, an optical cable, a hybrid cable, or the like, or any combination thereof. The wireless connection may be a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the model training module 410 may be divided into two or more units for extracting features and training a model, respectively. As another example, the processing engine 112 may include a storage module (not shown) used to store data and/or information relating to the car hailing service.

Figure 5:
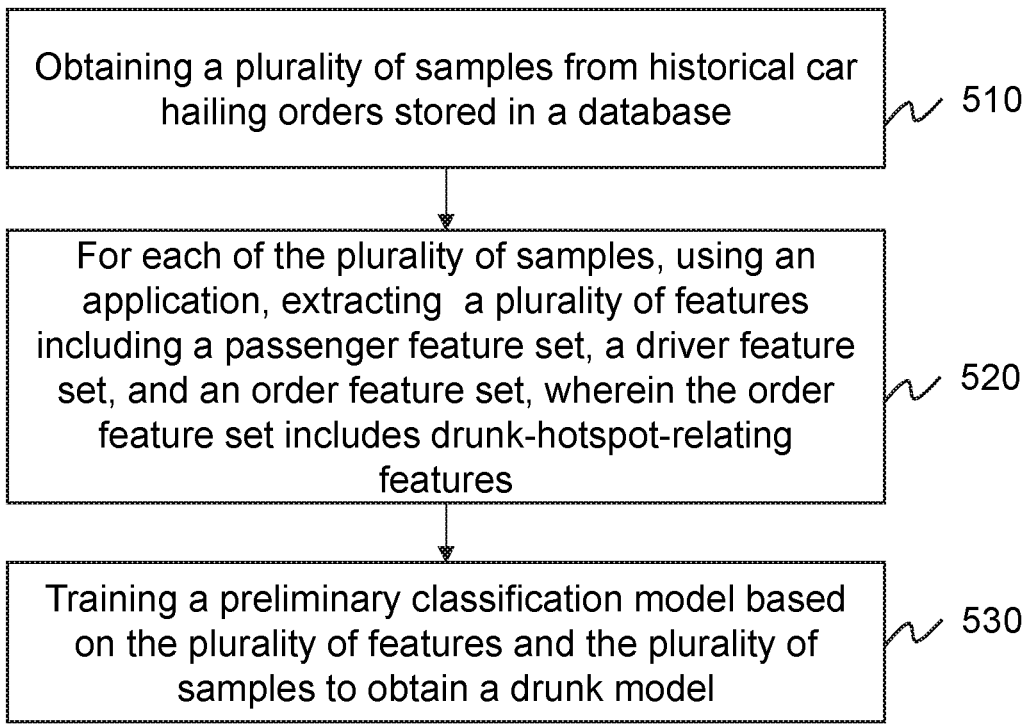
FIG. 5 is a flowchart illustrating an exemplary process for obtaining a drunk model according to some embodiments of the present disclosure.

FIG. 5 is a flowchart illustrating an exemplary process 500 for obtaining a drunk model according to some embodiments of the present disclosure. The process 500 may be executed by the AI system 100. For example, the process 500 may be implemented as a set of instructions (e.g., an application) stored in the storage ROM 230 or RAM 240. The processor 220 may execute the set of instructions, and when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 510, the processing engine 112 (e.g., the processor 220, the model training module 410) may obtain a plurality of samples from historical car hailing orders stored in a database.

As used herein, a historical car hailing order of the historical car hailing orders may refer to a car hailing order that has been completed. In some embodiments, a historical car hailing order may include information associated with the historical car hailing order, such as information associated with a passenger (e.g., a passenger who requested for the historical car hailing service), information associated with a driver (e.g., a driver who provided the historical car hailing service for the passenger), and information of the historical car hailing order (e.g., time information associated with the historical car hailing order, location information associated with the historical car hailing order, or ride-sharing information associated with the historical car hailing order, etc.). In some embodiments, the historical car hailing order orders may be within a predetermined time period. For example, the historical car hailing order may include orders in a year (e.g., the last year, the current year, the recent one year), half of a year (e.g., the recent six months, the first half of the current year), a quarter of a year (e.g., the recent three months, the second quarter of the current year), or the like, or any combination thereof. In some embodiments, the historical car hailing orders may be stored in any database or storage (e.g., the storage 140, the ROM 230, the RAM 240, etc.).

In some embodiments, each sample of the plurality of samples may correspond to a historical car hailing order. In some embodiments, the plurality of samples may correspond to a part or all of the historical car hailing orders stored in the database. For example, the number of the plurality of examples may be equal to or less than the number of the historical car hailing orders. As another example, the processing engine 112 may extract the plurality of samples from historical car hailing orders that are within a particular time period (e.g., from 8:00 pm of a day to 4:00 am of a next day of the day, in every night, etc.).

In some embodiments, the plurality of samples may include a positive sample set and a negative sample set. The positive sample set may include a plurality of historical drunk car hailing orders, and the negative sample set may include a plurality of historical non-drunk car hailing orders. A historical drunk car hailing order may refer to a historical car hailing order that the passenger thereof is a drunk passenger. A historical non-drunk car hailing order may refer to a historical car hailing order that the passenger thereof is not a drunk passenger. In some embodiments, the number of the plurality of historical drunk car hailing orders may be the same as or different from the number of the plurality of historical non-drunk car hailing orders.

For a historical car hailing order, the processing engine 112 may obtain information associated with the historical car hailing order. For example, the processing engine 112 may obtain feedback information from the passenger and/or the driver of the historical car hailing order. The feedback information associated with the historical car hailing order may include a complaint from the passenger of the historical car hailing order, a complaint from the driver of the historical car hailing order, or the like, or any combination thereof.

The feedback information associated with a historical car hailing order may include any form, such as a text, a voice, a video, etc. In some embodiments, the processing engine 112 may determine whether the feedback information associated with the historical car hailing order satisfies a predetermined condition. For example, the processing engine 112 may determine whether the feedback information includes keys words in accordance with (or match) predetermined particular keys words. The predetermined particular key words may indicate that the passenger of the historical car hailing order is drunk.

For example, in a Chinese semantic environment, the predetermined particular key words may include words such as "jiu," "zui," or "heduo" and include without words such as "jiudian," "wozuile," "zhendezuile," or "zhenshizuile." As another example, in an English semantic environment, the predetermined particular key words may include "drunk", "intoxication", "ebriety", etc. In response to a determination that the feedback information includes keys words match the predetermined particular keys words, the processing engine 112 may determine that the historical car hailing order corresponding to the feedback information is a historical drunk car hailing order and designate the historical drunk car hailing order as a positive sample. In response to a determination that the feedback information does not include keys words match the predetermined particular keys words, the processing engine 112 may determine that the historical car hailing order corresponding to the feedback information is a historical non-drunk car hailing order and designate the historical non-drunk car hailing order as a negative sample. The processing engine 112 may assign the positive sample to the positive sample set and the negative sample to the negative sample set. In addition or alternatively, the processing engine 112 may identify the plurality of historical drunk car hailing orders and/or the plurality of historical non-drunk car hailing orders according to other methods. For example, when the passenger requesting the car hailing service via a passenger terminal of the passenger, the passenger terminal may record the passenger's behaviors via a sensor of the passenger terminal (e.g., a camera of the passenger terminal, a voice receiver of the passenger terminal, etc.). As another example, a vehicle of the car hailing service may be equipped with a sensor (e.g., a camera, a voice receiver, an alcohol tester, etc.) for detecting whether the passenger is drunk when the passenger in inside the vehicle.

In some embodiments, after identifying the positive samples and/or the negative samples, the processing engine 112 may assign all or a part of positive samples (i.e., the historical drunk car hailing orders) from the historical car hailing orders to the positive sample set, and assign all or a part of negative samples (i.e., the historical non-drunk car hailing orders) from the historical car hailing orders to the negative sample set. For example, the processing engine 112 may determine whether a ratio of the number of the positive samples to the number of the negative samples is less than a preset ratio (e.g., 1:100). In response to a determination that the ratio of the number of the positive samples to the number of the negative samples is less than the preset ratio, the processing engine 112 may assign all of the positive samples to the positive sample set and a part of the negative samples to the negative sample set. The part of the negative samples may be determined by a data processing technology such as down-sampling, random forest, one class learning, or the like, or any combination thereof. In response to a determination that the ratio is not less than the preset ratio, the processing engine 112 may assign all of the positive samples to the positive sample set and all of the negative samples to the negative sample set.

In 520, for each of the plurality of samples, the processing engine 112 (e.g., the processor 220, the model training module 410) may extract a plurality of features using an application. In some embodiments, the plurality of features may include a passenger feature set, a driver feature set, and an order feature set. In some embodiments, the order feature set may include drunk-hotspot-relating features.

In some embodiments, the passenger feature set may refer to a set of feature information associated with a random passenger of each of the plurality of samples. The passenger feature may include the random passenger's essential features and features relating to the random passenger's historical orders. The random passenger's essential features may include a gender of the random passenger, an age of the random passenger, a registration duration (e.g., how long does the random passenger registers on the car hailing service platform), a type of terminal device (e.g., iOS™, Android™, Windows Phone™, etc.), or the like, or any combination thereof. The random passenger's historical orders may refer to historical car hailing orders that the random passenger has completed in the history. The random passenger's historical orders may be within a predetermined time period, for example, a year (e.g., the last year, the current year, the recent one year, etc.), half of a year (e.g., the recent six months, the first half of the current year, etc.), a quarter of a year (e.g., the recent three months, the second quarter of the current year, etc.), or the like, or any combination thereof. The features relating to the random passenger's historical orders may include the number of the random passenger's historical orders, the number of complaints from the random passenger, the number of complaints that the random passenger received from drivers, the number of cancelling historical orders that the random passenger cancelled, or the like, or any combination thereof.

In some embodiments, the driver feature set may refer to a set of feature information associated with a random driver of each of the plurality of samples. The driver feature may include the random driver's essential features and features relating to the random driver's historical orders. The random driver's essential features may include a gender of the random driver, an age of the random driver, a registration duration (e.g., how long does the random driver registers on the car hailing service platform), a driving experience, a vehicle type of the random driver, or the like, or any combination thereof. The random driver's historical orders may refer to historical car hailing orders that the random driver has completed in the history. The random driver's historical orders may be within a predetermined time period, for example, a year (e.g., the last year, the current year, the recent one year, etc.), half of a year (e.g., the recent six months, the first half of the current year, etc.), a quarter of a year (e.g., the recent three months, the second quarter of the current year, etc.), or the like, or any combination thereof. The features relating to the random driver's historical orders may include the number of the random driver's historical orders, evaluations (e.g., a service score, a grade of the random driver), the number of complaints from the random driver, the number of complaints that the random driver received, the number of historical orders that the random driver has completed during a particular time period (e.g., a night peak from 7 pm to 11 pm of a day), or the like, or any combination thereof.

In some embodiments, the order feature set may refer to a set of feature information associated with a random order corresponding to each of the plurality of samples. The order feature may include the random order's essential features and drunk-hotspot-relating features. The random order's essential features may include a location of the random order (e.g., longitude and latitude of a start point or an end point, a point of interest (POI) of the random order, etc.), an order time (e.g., time when the random order is initiated, time when the random order ends, etc.), a type of the random order (e.g., a ride-sharing order, a taxi order, an order with an end point of an airport, etc.), or the like, or any combination thereof. The drunk-hotspot-relating features may refer to features that the random order being associated with a drunk-hotpot. A drunk hotspot may refer to a region or an area where more potential drunk passengers may locate than a non-drunk hotspot. In some embodiments, the drunk hotspot may be determined based on a plurality of historical designated-driving orders, which may be found elsewhere of the present disclosure, e.g., in FIG. 6 and the descriptions thereof. In some embodiments, the processing engine 112 may map the random order to a drunk hotspot to obtain the drunk-hotspot-relating features. The processing engine 112 may determine that whether the random order is associated with a drunk hotspot or a non-drunk hotspot based on location information (e.g., longitude and latitude of a start point of the random order). The drunk-hotspot-relating features may include features of the drunk-hotspot or the non-dunk hotspot associated with the random order, which may be found elsewhere of the present disclosure, e.g., in FIG. 7 and the descriptions thereof. In some embodiments, the drunk-hotspot-relating features may include the number of historical designated-driving orders within the drunk hotspot, the number of historical car hailing orders within the drunk hotspot, the number of drunk-complaint car hailing orders within the drunk hotspot, an identification (ID) of the drunk hotspot, or the like, or any combination thereof.

In some embodiments, the processing engine 112 may process information of each of the plurality of samples to extract the plurality of features. For example, for a categorical feature such as the gender of the random passenger, the processing engine 112 may designate the gender of female as (0, 1) and designate the gender of male as (1, 0) by one-hot encoding, which may binarize the categorical feature to be a vector in the Euclidean space. The processing engine 112 may further extract the vector representing the categorical feature as one of the plurality of features. As another example, for a continuous feature (e.g., the number of historical orders that the random passenger has completed), the processing engine 112 may normalization the continuous feature by using z-score normalization. For example, the processing engine 112 may determine a mean and a standard deviation of the continuous feature, and normalize the continuous feature based on the determined mean and the standard deviation. In some embodiments, a sample of the plurality of samples may include one or more features missing. For example, the random order maps no drunk hotspot, and the processing engine 112 may fill the ID of the drunk hotspot as 0.

In some embodiments, the processing engine 112 may extract the plurality of features using an application that used for extracting features. For example, the application may be a programmed procedure, a programmed hardware, a method, a process, or the like, or any combination thereof.

In 530, the processing engine 112 (e.g., the processor 220, the model training module 410) may train a preliminary classification model based on the plurality of features and the plurality of samples to obtain a drunk model.

In some embodiments, the preliminary classification model may include a machine learning model used for predicting a classification of an order. For example, the preliminary classification model may include a Gradient Boosting Decision Tree (GBDT) model, an Extreme Gradient Boosting (XGBoost) model, a random forest model, or the like, or any combination thereof. In some embodiments, the preliminary classification model may have default settings (e.g., one or more preliminary parameters) or be adjustable in different situations. Taking a preliminary classification model of XGBoost model as an example, the preliminary classification model may include one or more preliminary parameters, such as a booster type (e.g., tree-based model or linear model), a booster parameter (e.g., a maximum depth, a maximum number of leaf nodes), a learning task parameter (e.g., an objective function of training), or the like, or any combination thereof. The drunk model may be a trained model based on the preliminary classification model (e.g. trained by adjusting the one or more preliminary parameters of the preliminary classification model). The drunk model may be configured to determine or predict a drunk probability of a passenger and/or a category indicating whether the passenger is drunk.

In some embodiments, in the training of the preliminary classification model, a positive sample in the positive sample set and a negative sample in the negative sample set may be designated as different probabilities that indicate whether a historical passenger of a historical car hailing order is drunk. For example, the probability corresponding to a historical drunk car hailing order in the positive sample set may be designated as a first possibility, and the probability corresponding to a historical non-drunk car hailing order in the negative sample set may be designated as a second possibility. The first probability may be less than the second probability. Merely by way of example, the first probability may be 0 and the second probability may be 1. As another example, the first probability value may be 0.3 and the second probability value may be 0.7. Alternatively, the positive sample set and the negative sample set of the plurality of samples may be designated as two separate categories. For example, a positive sample in the positive sample set and a negative sample in the negative sample set may be labeled as a drunk category and a non-drunk category.

The processing engine 112 may input the plurality of features of each of the plurality of samples into the preliminary classification model to train the preliminary classification model. The corresponding probabilities that indicate whether a historical passenger of a historical car hailing order is drunk and/or the corresponding drunk/non-drunk categories may be labels (i.e., expected outputs). The preliminary parameters of the preliminary classification model may be adjusted to obtain updated parameters of the drunk model.

In some embodiments, the adjusted preliminary classification model may further be tested by a plurality of testing samples. The plurality of testing samples may be similar to the plurality of samples or a part of the plurality of samples. For example, the plurality of samples may be divided into a training set for training the preliminary classification model and a testing set for testing the adjusted preliminary classification model. A plurality of features of each of the plurality of testing samples may be input to the adjusted preliminary classification model to output a predicted corresponding predicted testing probability (or a predicted testing category). The processing engine 112 may further determine a difference between the predicted testing probabilities and known probabilities (or difference between predicted testing categories and known categories) of the plurality of testing samples. If the difference satisfies a predetermined condition, the processing engine 112 may designate the adjusted preliminary classification model as the drunk model. If the difference does not satisfy the predetermined condition, the processing engine 112 may further training the adjusted preliminary classification model with additional plurality of samples until the difference satisfies the predetermined condition to obtain the drunk model. The predetermined condition may be a default value stored in the system 100, or determined by a user and/or the system 100 according to different situations.

It should be noted that the above description is merely provided for the purposes of illustration, and not intended to limit the scope of the present disclosure. For persons having ordinary skills in the art, multiple variations and modifications may be made under the teachings of the present disclosure. For example, operation 510 and operation 520 may be integrated into a single step. However, those variations and modifications do not depart from the scope of the present disclosure.

Figure 6:
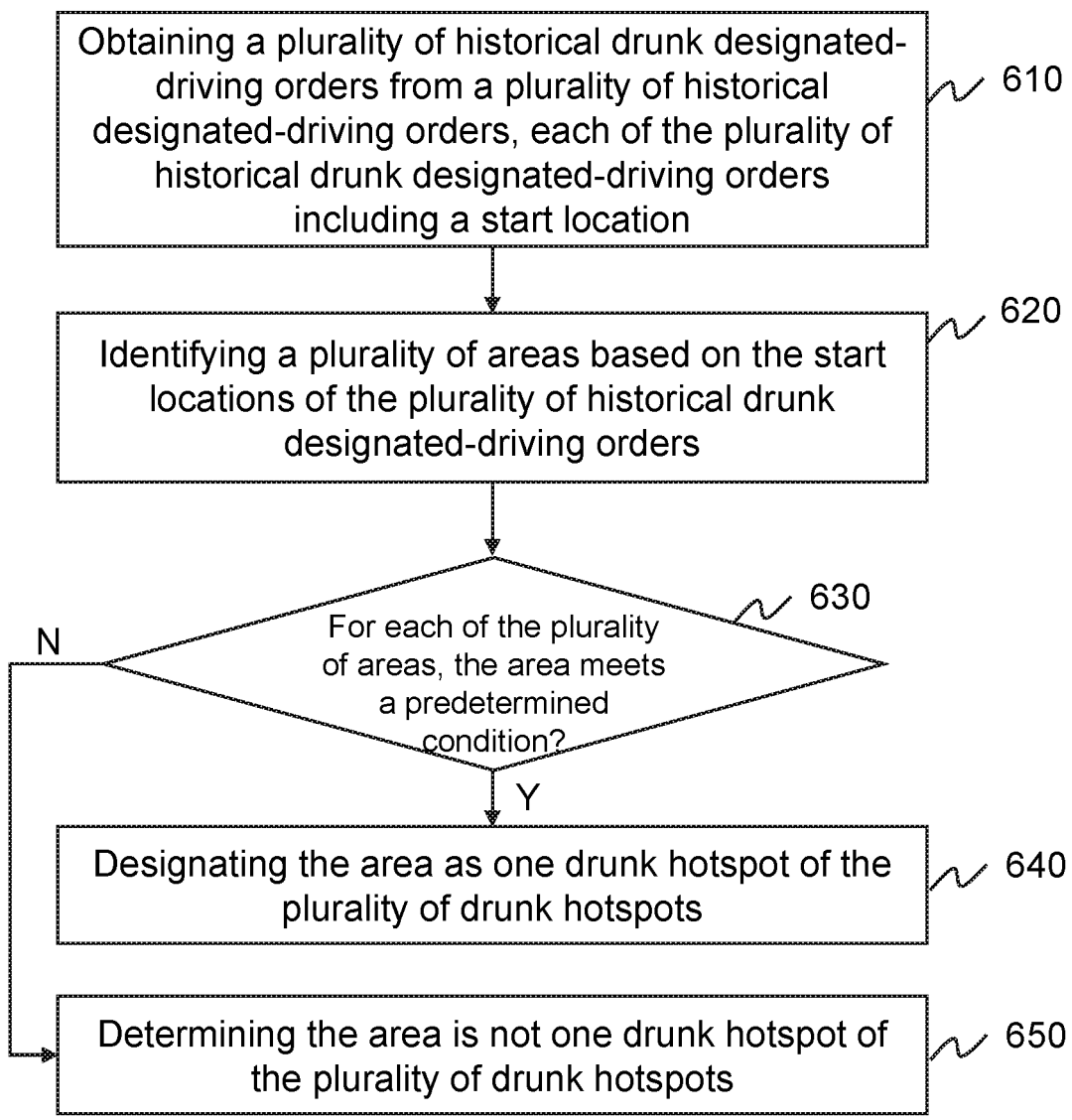
FIG. 6 is a flowchart illustrating an exemplary process for identifying a plurality of drunk hotspots according to some embodiments of the present disclosure.

FIG. 6 is a flowchart illustrating an exemplary process 600 for identifying a plurality of drunk hotspots according to some embodiments of the present disclosure. The process 600 may be executed by the AI system 100. For example, the process 600 may be implemented as a set of instructions (e.g., an application) stored in the storage ROM 230 or RAM 240. The processor 220 may execute the set of instructions, and when executing the instructions, it may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In 610, the processing engine 112 (e.g., the processor 220, the hotspot identifying module 420) may obtain a plurality of historical drunk designated-driving orders from a plurality of historical designated-driving orders. In some embodiments, each of the plurality of historical drunk designated-driving orders may include a start location.

In some embodiments, a historical designated-driving order may refer to a historical order that a historical requester requests for a service of designating a designated driver (also referred to as a designated-driving service) to drive a vehicle (e.g., a car) associated with the historical requester from a start location to a destination. The start location may refer to a location where the designated driver picks up the historical requester or gets the vehicle to start the designated-driving service. The historical designated-driving order may be determined or labeled to be a historical drunk designated-driving order or a historical non-drunk designated-driving order based on whether the historical requester is drunk. For example, when the historical requester requests a designated-driving service via a service application installed in a user terminal thereof, the historical requester may input information that whether the historical requester is drunk for initiating the designated-driving service. As another example, the designated driver may evaluate or provide a feedback that whether the historical requester is drunk when or after the designated driver picks up the historical requester. The processing engine 112 may label or determine the historical designated-driving order as a historical drunk designated-driving order or a historical non-drunk designated-driving order based on the inputted information of the historical requester, the evaluation from the designated driver, and/or the feedback from the designated driver. In some embodiments, each of the plurality of historical drunk designated-driving orders may further include information associated with a historical requester, information associated with a historical designated driver, information of the historical designated-driving order (e.g., time information associated with the historical designated-driving order, location information associated with the historical designated-driving order, etc.), or the like, or any combination thereof.

In some embodiments, the plurality of historical designated-driving orders may be within a same region (e.g., a same city, a same district, etc.). In some embodiments, the plurality of historical designated-driving orders may be within a predetermined time period, for example, a year (e.g., the last year, the current year, the recent one year), half of a year (e.g., the recent six months, the first half of the current year), a quarter of a year (e.g., the recent three months, the second quarter of the current year), or the like, or any combination thereof. In some embodiments, the plurality of historical designated-driving orders may be stored in a database (e.g., the storage 140)

In 620, the processing engine 112 (e.g., the processor 220, the hotspot identifying module 420) may identify a plurality of areas based on the start locations of the plurality of historical drunk designated-driving orders.

In some embodiments, the processing engine 112 may identify longitudes and latitudes of the start locations of the plurality of historical drunk designated-driving orders. Taking the plurality of historical designated-driving orders within a city as an example, the processing engine 112 may divided the city into a plurality of grids (e.g., square grids, hexagonal grids). Each of the plurality of grids may include a predetermined size. For example, each of the plurality of square grids may be an area of 3 kilometers×3 kilometers. The processing engine 112 may further map the start locations of the plurality of historical drunk designated-driving orders to one or more divided grids based on longitudes and latitudes of the start locations. For example, if a longitude and latitude of a start location is within a grid of the plurality of grids, the processing engine 112 may identify the area in which the grid located.

In 630, for each of the plurality of areas, the processing engine 112 (e.g., the processor 220, the hotspot identifying module 420) may determine whether the area meets a predetermined condition.

In some embodiments, the predetermined condition may be a criteria to determine whether the area is a drunk hotspot where there are a large number of drunk people. For example, the predetermined condition may include a number of historical drunk designated-driving orders in the area is greater than a number threshold, a ratio of a number of historical drunk-complaint car hailing orders to a number of historical drunk designated-driving orders is greater than a ratio threshold, or the like, or any combination thereof. The historical drunk designated-driving orders in the area may refer to historical drunk designated-driving orders of which start locations are within the area. The historical drunk-complaint car hailing orders may refer to historical drunk car hailing orders of which start locations are within the area. The historical drunk designated-driving orders in the area and the historical drunk-complaint car hailing orders may be within a same predetermined time period (e.g., recent one month). The number threshold and/or the ratio threshold may be set by an operator (e.g., based on experience of the operator) or according to a default setting of the AI system 100.

For example, the processing engine 112 may determine whether the number of historical drunk designated-driving orders in the area is greater than the number threshold. In response to a determination that the number of historical drunk designated-driving orders in the area is greater than the number threshold, the processing engine 112 may proceed to 640. In response to a determination that the number of historical drunk designated-driving orders in the area is not greater than the number threshold, the processing engine 112 may determine whether the ratio of the number of historical drunk-complaint car hailing orders to the number of historical drunk designated-driving orders is greater than the ratio threshold. In response to a determination that the ratio of the number of historical drunk-complaint car hailing orders to the number of historical drunk designated-driving orders is greater than the ratio threshold, the processing engine 112 may proceed to 640. In response to a determination that the ratio of the number of historical drunk-complaint car hailing orders to the number of historical drunk designated-driving orders is not greater than the ratio threshold, the processing engine 112 may proceed to 650.

In 640, in response to a determination that the area meets the predetermined condition, the processing engine 112 (e.g., the processor 220, the hotspot identifying module 420) may designate the area as one drunk hotspot of the plurality of drunk hotspots.

In some embodiments, a drunk hotspot may refer to an area where there may be a large number of drunk people. For example, in the drunk hotspot there may be more drunk historical requesters or historical passengers than in a non-drunk hotspot. The drunk hotspot may indicate that in the area there may be more potential passengers than the non-drunk hotspot.

In 650, in response to a determination that the area does not meet the predetermined condition, the processing engine 112 (e.g., the processor 220, the hotspot identifying module 420) may determine that the area is not one drunk hotspot of the plurality of drunk hotspots. In some embodiments, the processing engine 112 may determine that the area is a non-drunk hotspot.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 600. For example, process 600 may further include storing the plurality of drunk hotspots after identifying the plurality of drunk hotspots.

Figure 7:
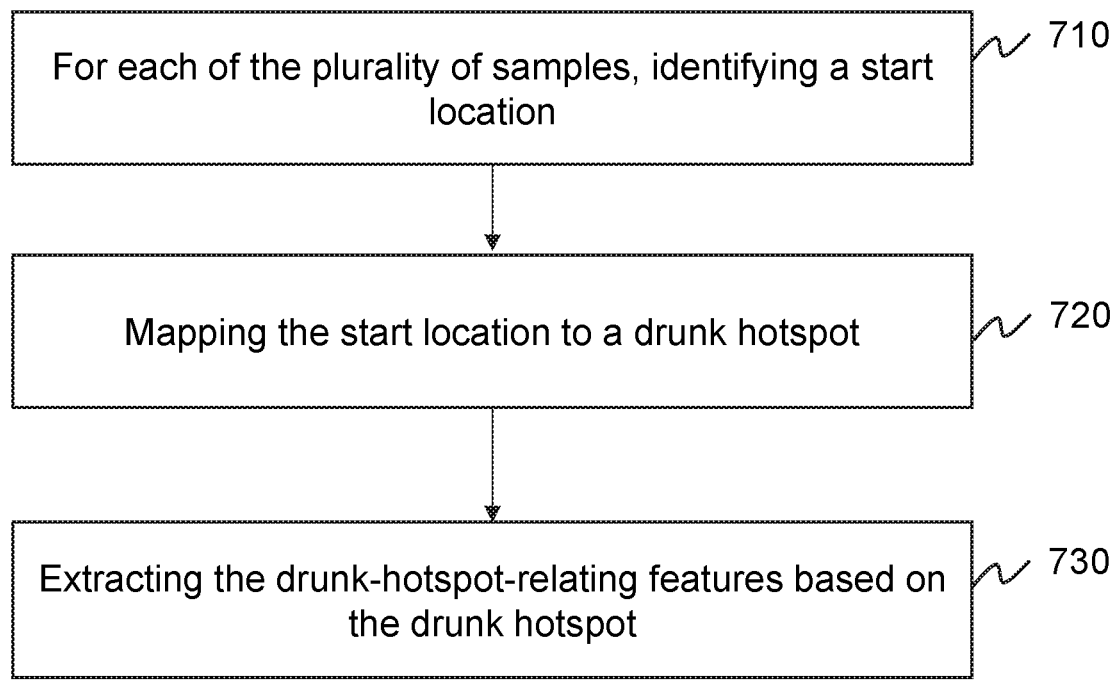
FIG. 7 is a flowchart illustrating an exemplary process for obtaining drunk-hotspot relating features according to some embodiments of the present disclosure.

FIG. 7 is a flowchart illustrating an exemplary process 700 for obtaining drunk-hotspot relating features according to some embodiments of the present disclosure. The process 700 may be executed by the AI system 100. For example, the process 700 may be implemented as a set of instructions (e.g., an application) stored in the storage ROM 230 or RAM 240. The processor 220 may execute the set of instructions, and when executing the instructions, it may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 710, for each of the plurality of samples, the processing engine 112 (e.g., the processor 220, the model training module 410) may identify a start location.

In some embodiments, the start location may refer to a pick-up location where a driver picks up a passenger associated with a historical car hailing order corresponding to the each of the plurality of samples. In some embodiments, the processing engine 112 may further obtain a longitude and latitude or point of interest (e.g., a location name or location address) of the start location.

In 720, the processing engine 112 (e.g., the processor 220, the model training module 410) may map the start location to a drunk hotspot.

In some embodiments, the processing engine 112 may map the start location to the drunk hotspot based on the longitude and latitude of the start location. For example, the processing engine 112 may match the longitude and latitude of the start location with longitudes and latitudes of areas corresponding to a plurality of drunk hotspots to determine whether the longitude and latitude of the start location matches (e.g., is within) one of the longitudes and latitudes of areas corresponding to a plurality of drunk hotspots. In response to a determination that the longitude and latitude of the start location matches one of the longitudes and latitudes of areas corresponding to the plurality of drunk hotspots, the processing engine 112 may determine that the start location is within a drunk hotspot. The drunk hotspot may include the longitude and latitude of the start location. In response to a determination that the longitude and latitude of the start location matches none of the longitudes and latitudes of areas corresponding to a plurality of drunk hotspots, the processing engine 112 may determine that the start location is not within a drunk hotspot. In some embodiments, the processing engine 112 may further map the start location to a non-drunk hotspot. The non-drunk hotspot may include the longitude and latitude of the start location.

In 730, the processing engine 112 (e.g., the processor 220, the model training module 410) may extract the drunk-hotspot-relating features based on the drunk hotspot.

In some embodiments, if the start location is mapped to the drunk hotspot, the processing engine 112 may extract drunk-hotspot-relating features associated with the drunk hotspot. For example, the drunk-hotspot-relating feature may include the number of historical designated-driving orders within the drunk hotspot, the number of historical car hailing orders within the drunk hotspot, the number of drunk-complaint car hailing orders within the drunk hotspot, an identification (ID) of the drunk hotspot, whether the start location is located in a drunk hotspot, or the like, or any combination thereof. The ID of the drunk hotspot may refer to a name or number that used for labeling the drunk hotspot to distinguish the drunk hotspot from other drunk hotspot of the plurality of drunk hotspot.

In some embodiments, if the start location is mapped to the non-drunk hotspot, the processing engine 112 may extract no drunk-hotspot-relating features associated with any drunk hotspot. The processing engine 112 may fill the drunk-hotspot-relating features as 0. For example, if the start location is mapped to the non-drunk hotspot, the number of historical designated-driving orders within the drunk hotspot, the number of historical car hailing orders within the drunk hotspot, the number of drunk-complaint car hailing orders within the drunk hotspot, whether the start location is located in a drunk hotspot, and/or an identification (ID) of the drunk hotspot are all 0.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 700. For example, process 700 may further include storing the drunk-hotspot-relating features after extracting the drunk-hotspot-relating features.

Figure 8:
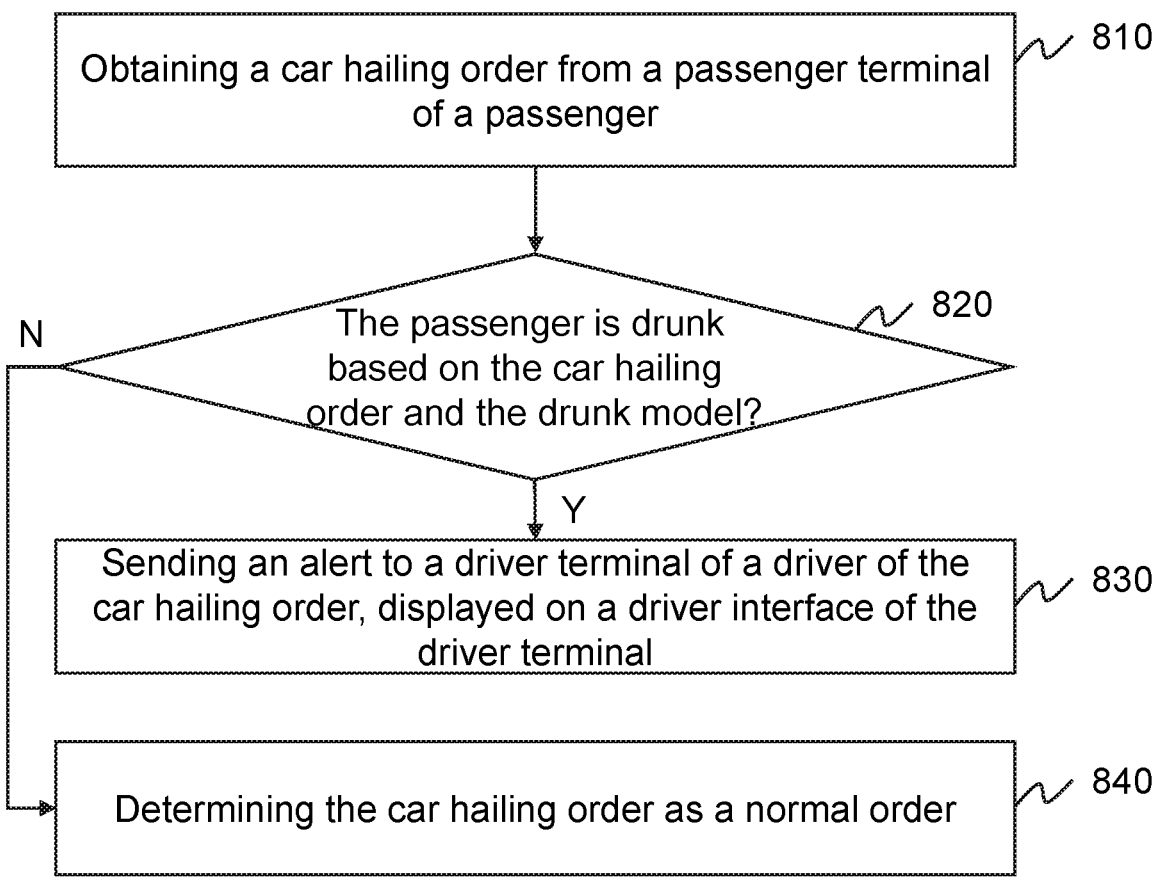
FIG. 8 is a flowchart illustrating an exemplary process for sending an alert to a driver terminal of a driver according to some embodiments of the present disclosure.

FIG. 8 is a flowchart illustrating an exemplary process 800 for sending an alert to a driver terminal of a driver according to some embodiments of the present disclosure. The process 800 may be executed by the AI system 100. For example, the process 800 may be implemented as a set of instructions (e.g., an application) stored in the storage ROM 230 or RAM 240. The processor 220 may execute the set of instructions, and when executing the instructions, it may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process as illustrated in FIG. 8 and described below is not intended to be limiting.

In 810, the processing engine 112 (e.g., the processor 220, the order obtaining module 430) may obtain a car hailing order from a passenger terminal of a passenger.

In some embodiments, the car hailing order may be a real-time car hailing order, a car hailing order within a predetermined period (e.g., a night peak from 7:00 pm to 11:00 pm), etc.

In 820, the processing engine 112 (e.g., the processor 220, the drunk determining module 440) may determine whether the passenger is drunk based on the car hailing order and the drunk model.

In some embodiments, the processing engine 112 may extract a plurality of features from the car hailing order. The plurality of features may include a passenger feature set, a driver feature set, an order feature set, or the like, or any combination thereof. Descriptions of features such as the passenger feature set, the driver feature set, and/or the order feature set may be found elsewhere in the present disclosure (e.g., FIG. 5 and the description thereof). The method and/or process for extracting features may be found elsewhere in the present disclosure (e.g., FIG. 5 and the description thereof). The processing engine 112 may input the plurality of features extracted from the car hailing order into the drunk model. The drunk model may output a predicted probability or a predicted category that whether the passenger of the car hailing order is drunk. The processing engine 112 may further determine whether the passenger is drunk based on the predicted probability or the predicted category. For example, the processing engine 112 may determine the passenger is drunk if the predicted category indicates that the passenger is drunk. Details of determining whether the passenger is drunk based on the predicted probability may be found elsewhere of the present disclosure (e.g., in FIG. 9 and the descriptions thereof). In response to a determination that the passenger is drunk, the processing engine 112 may proceed to 830. In response to the determination that the passenger is not drunk, the processing engine 112 may proceed to 840.

In 830, in response to a determination that the passenger is drunk, the processing engine 112 (e.g., the processor 220, the alert sending module 450) may send an alert to a driver terminal of a driver of the car hailing order. In some embodiments, the alert may be displayed on a driver interface of the driver terminal.

In some embodiments, the alert may include a notification that the passenger may be drunk, a note that remind the driver to make an effort to avoid conflict, or the like, or any combination thereof. In some embodiments, the alert may further include an inquiry for the driver to generate a feedback if the passenger is actually drunk. The feedback may be used for updating the drunk model. The alert may be presented in a form of text, voice, image (or video), or the like, or any combination thereof.

In some embodiments, in response to the determination that the passenger is drunk, the processing engine 112 may reassign another driver for the passenger. The reassigned driver may be a high graded driver. Under the service provided by the reassigned driver, the probability of a conflict between the drunk passenger and the reassigned driver may be small. In some embodiments, in response to the determination that the passenger is drunk, the processing engine 112 may charge the passenger an additional fee to mitigate the conflict. For example, the additional fee may be a fee for cleaning the car in case that the drunk passenger vomits inside the car. As another example, the additional fee may be a tip for encouraging a driver to pick up the drunk passenger.

In 830, in response to a determination that the passenger is not drunk, the processing engine 112 (e.g., the processor 220, the alert sending module 450) may determine the car hailing order as a normal order.

In some embodiments, in response to the determination that the passenger is not drunk, the processing engine 112 may provide a normal service for the passenger (e.g., push the car hailing order to a driver as a normal order).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the exemplary process 800. For example, process 800 may further include storing the car hailing order after determining that the passenger thereof is drunk.

Figure 9:
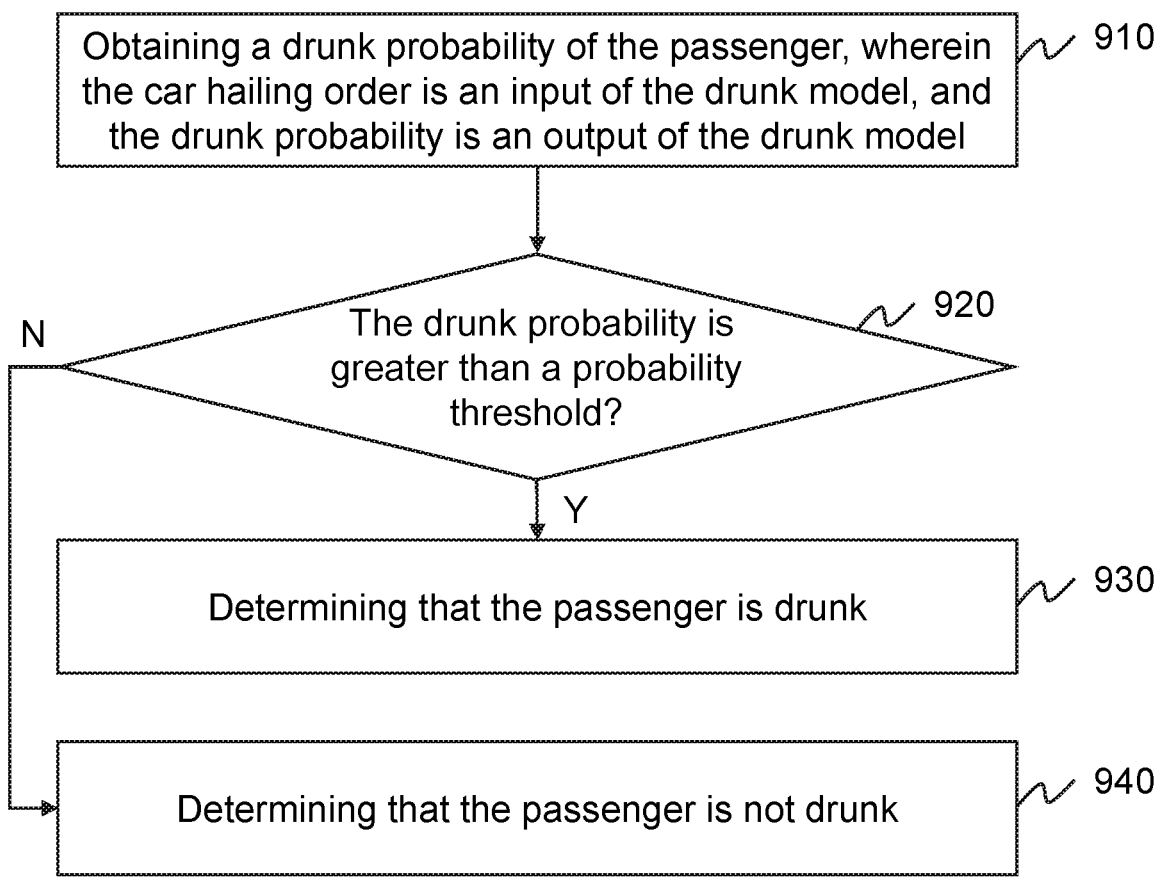
FIG. 9 is a flowchart illustrating an exemplary process for determining whether a passenger is drunk according to some embodiments of the present disclosure.

FIG. 9 is a flowchart illustrating an exemplary process 900 for determining whether a passenger is drunk according to some embodiments of the present disclosure. The process 900 may be executed by the AI system 100. For example, the process 900 may be implemented as a set of instructions (e.g., an application) stored in the storage ROM 230 or RAM 240. The processor 220 may execute the set of instructions, and when executing the instructions, it may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting.

In 910, the processing engine 112 (e.g., the processor 220, the drunk determining module 440) may obtain a drunk probability of the passenger. In some embodiments, the car hailing order may be an input of the drunk model, and the drunk probability may be an output of the drunk model.

In some embodiments, the drunk probability may indicate a drunk possibility of the passenger. A higher drunk probability of the passenger may indicate that the passenger is more likely to be drunk than a lower drunk probability of the passenger. For example, the drunk probability of the passenger may range from 0 to 1. A drunk probability of 0.7 may indicate that the passenger is more likely to be drunk than a drunk probability of 0.3.

In some embodiments, the processing engine 112 may input the car hailing order into the drunk model. The drunk mode may output the drunk probability of the passenger by analyzing the input, for example, by extracting the plurality of features from the car hailing order.

In 920, the processing engine 112 (e.g., the processor 220, the drunk determining module 440) may determine whether the drunk probability is greater than a probability threshold.

In some embodiments, the probability threshold may be a threshold index to evaluate whether the passenger is drunk. If the drunk probability is greater than the probability threshold, the passenger may be more likely to be drunk. Alternatively, if the drunk probability is not greater than the probability threshold, the passenger may be more likely to be not drunk. In some embodiments, the probability threshold may be set by an operator (e.g., based on experience of the operator) or according to a default setting of the AI system 100. For example, when the drunk probability of the passenger ranges from 0 to 1, the probability threshold may be set to be any value from 0 to 1 (e.g., 0.6, 0.85, 0.9, etc.).

In 930, in response to a determination that the drunk probability is greater than the probability threshold, the processing engine 112 (e.g., the processor 220, the drunk determining module 440) may determine that the passenger is drunk.

In 940, in response to a determination that the drunk probability is not greater than the probability threshold, the processing engine 112 (e.g., the processor 220, the drunk determining module 440) may determine that the passenger is not drunk.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 900. For example, process 900 may further include storing the drunk passenger after identifying the passenger is drunk.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

We claim:

1. An artificial intelligent system for identifying a drunk passenger of a car hailing order, comprising:
   at least one storage medium including a set of instructions for identifying a drunk passenger of a car hailing order; and
   at least one processor in communication with the storage medium, wherein when executing the set of instructions, the at least one processor is directed to:
      obtain a plurality of samples from historical car hailing orders stored in a database;
      for each of the plurality of samples, using an application, extract a plurality of features including a passenger feature set, a driver feature set, and an order feature set, wherein the order feature set includes drunk-hotspot-relating features; and
      train a preliminary classification model based on the plurality of features and the plurality of samples to obtain a drunk model, wherein the drunk-hotspot-relating features is obtained by identifying a plurality of drunk hotspots based on a plurality of historical designated-driving orders, and the plurality of drunk hotspots is identified by:
         obtaining a plurality of historical drunk designated-driving orders from the plurality of historical designated-driving orders, each of the plurality of historical drunk designated-driving orders including a start location;
         identifying a plurality of areas based on the start locations of the plurality of historical drunk designated-driving orders; and
         for each of the plurality of areas,
            determining whether the area meets a predetermined condition, and
            in response to a determination that the area meets the predetermined condition, designating the area as one drunk hotspot of the plurality of drunk hotspots.

2. The system of claim 1, wherein the plurality of samples include a positive sample set and a negative sample set, wherein
   the positive sample set includes a plurality of historical drunk car hailing orders, and
   the negative sample set includes a plurality of historical non-drunk car hailing orders.

3. The system of claim 1, wherein the passenger feature set includes a random passenger's essential features and features relating to the random passenger's historical orders,
   the driver feature set includes a random driver's essential features and features relating to the random driver's historical orders, and
   the order feature set further includes a random order's essential features.

4. The system of claim 1, wherein the predetermined condition includes at least one of:
   a number of historical drunk designated-driving orders in the area is greater than a number threshold; or
   a ratio of a number of historical drunk-complaint car hailing orders to a number of historical drunk designated-driving orders is greater than a ratio threshold.

5. The system of claim 1, wherein to extract the plurality of features, the at least one processor is further directed to:
for each of the plurality of samples,
identify a start location;
map the start location to a drunk hotspot; and
extract the drunk-hotspot-relating features based on the drunk hotspot.

6. The system of claim 1, wherein the preliminary classification model is a Gradient Boosted Decision Tree (GBDT) model.

7. The system of claim 1, wherein the at least one processor is further directed to:
obtain a car hailing order from a passenger terminal of a passenger; and
determine whether the passenger is drunk based on the car hailing order and the drunk model.

8. The system of claim 7, wherein to determine whether the passenger is drunk, the at least one processor is further directed to:
obtain a drunk probability of the passenger, wherein the car hailing order is an input of the drunk model, and the drunk probability is an output of the drunk model;
determine whether the drunk probability is greater than a probability threshold; and
in response to a determination that the drunk probability is greater than the probability threshold, determine that the passenger is drunk.

9. The system of claim 7, wherein the at least one processor is further directed to:
in response to a determination that the passenger is drunk, send an alert to a driver terminal of a driver of the car hailing order, displayed on a driver interface of the driver terminal.

10. An artificial intelligent method for identifying a drunk passenger of a car hailing order, implemented on a computing device including at least one storage medium including a set of instructions, a data exchange port communicatively connected to a network, and at least one processor in communication with the storage medium, the method comprising:
obtaining a plurality of samples from historical car hailing orders stored in a database;
for each of the plurality of samples, using an application, extracting a plurality of features including a passenger feature set, a driver feature set, and an order feature set, wherein the order feature set includes drunk-hotspot-relating features; and
training a preliminary classification model based on the plurality of features and the plurality of samples to obtain a drunk model, wherein the drunk-hotspot-relating features is obtained by identifying a plurality of drunk hotspots based on a plurality of historical designated-driving orders, and the plurality of drunk hotspots is identified by:
obtaining a plurality of historical drunk designated-driving orders from the plurality of historical designated-driving orders, each of the plurality of historical drunk designated-driving orders including a start location;
identifying a plurality of areas based on the start locations of the plurality of historical drunk designated-driving orders; and
for each of the plurality of areas,
determining whether the area meets a predetermined condition, and
in response to a determination that the area meets the predetermined condition, designating the area as one drunk hotspot of the plurality of drunk hotspots.

11. The method of claim 10, wherein the plurality of samples include a positive sample set and a negative sample set, wherein
the positive sample set includes a plurality of historical drunk car hailing orders, and
the negative sample set includes a plurality of historical non-drunk car hailing orders.

12. The method of claim 10, wherein
the passenger feature set includes a random passenger's essential features and features relating to the random passenger's historical orders,
the driver feature set includes a random driver's essential features and features relating to the random driver's historical orders, and
the order feature set further includes a random order's essential features.

13. The method of claim 10, wherein the predetermined condition includes at least one of:
a number of historical drunk designated-driving orders in the area is greater than a number threshold; or
a ratio of a number of historical drunk-complaint car hailing orders to a number of historical drunk designated-driving orders is greater than a ratio threshold.

14. The method of claim 10, wherein the extracting the plurality of features comprises:
for each of the plurality of samples,
identifying a start location;
mapping the start location to a drunk hotspot; and
extracting the drunk-hotspot-relating features based on the drunk hotspot.

15. The method of claim 10, wherein the preliminary classification model is a Gradient Boosted Decision Tree (GBDT) model.

16. The method of claim 10, wherein the method further comprises:
obtaining a car hailing order from a passenger terminal of a passenger;
determining whether the passenger is drunk based on the car hailing order and the drunk model; and
in response to a determination that the passenger is drunk, sending an alert to a driver terminal of a driver of the car hailing order, displayed on a driver interface of the driver terminal.

17. The method of claim 16, wherein the determining whether the passenger is drunk comprises:
obtaining a drunk probability of the passenger, wherein the car hailing order is an input of the drunk model, and the drunk probability is an output of the drunk model;
determining whether the drunk probability is greater than a probability threshold; and
in response to a determination that the drunk probability is greater than the probability threshold, determining that the passenger is drunk.

18. A non-transitory readable medium, comprising at least one set of instructions for identifying a drunk passenger of a car hailing order, wherein when executed by at least one processor of an electrical device, the at least one set of instructions directs the at least one processor to perform a method, the method comprising:
obtaining a plurality of samples from historical car hailing orders stored in a database;
for each of the plurality of samples, using an application, extracting a plurality of features including a passenger feature set, a driver feature set, and an order feature set, wherein the order feature set includes drunk-hotspot-relating features; and training a preliminary classification model based on the plurality of features and the plurality of samples to obtain a drunk model, wherein the drunk-hotspot-relating features is obtained by identifying a plurality of drunk hotspots based on a plurality of historical designated-driving orders, and the plurality of drunk hotspots is identified by:

obtaining a plurality of historical drunk designated-driving orders from the plurality of historical designated-driving orders, each of the plurality of historical drunk designated-driving orders including a start location;

identifying a plurality of areas based on the start locations of the plurality of historical drunk designated-driving orders; and for each of the plurality of areas,
  determining whether the area meets a predetermined condition, and
  in response to a determination that the area meets the predetermined condition, designating the area as one drunk hotspot of the plurality of drunk hotspots.

\* \* \* \* \*